3,439,008
METHOD FOR MAKING ORGANOMETALLIC HYDRIDES
Abe Berger, Schenectady, N.Y., assignor to General Electric Company, a corporation of New York
No Drawing. Filed Mar. 31, 1966, Ser. No. 538,976
Int. Cl. C07f 7/12, 7/18, 7/00
U.S. Cl. 260—429                                 7 Claims

ABSTRACT OF THE DISCLOSURE

A method is provided for converting certain halogenated Group IVb elemental materials, such as halosilane, halosiloxane, or halogermane to the corresponding Group IVb elemental hydrides utilizing a tin hydride as a reducing agent and a Group III metal compound, such as alkylaluminum halide as a promoter.

---

The present invention relates to a method for reducing halides of certain Group IVb elements such as silicon and germanium with a hydride of tin.

Various methods are known for reducing halides, including organohalides of elements, such as silicon, and germanium. For example, organosilicon hydrides can be made by reducing organohalosilanes in a heterogeneous mixture of an alkali metal hydride, a promoter, and an organic solvent, as illustrated by the equation, (1) $$(R)_aSi(H)_bX_{4-a-b} \xrightarrow{<H>} (R)_cSi(H)_{4-c}$$

where R is selected from monovalent hydrocarbon radicals and halogenated monovalent hydrocarbon radicals, X is a halogen radical, $a$ is equal to from 0 to 3, inclusive, $b$ is a whole number equal to 0 to 2, inclusive, the sum of $a$ and $b$ is equal to 1 to 3, inclusive, and $c$ is an integer equal to 1 to 3, inclusive.

Jenkner Patents 3,043,857 and 3,100,788 show the reduction of organohalides of certain Group IVb elements, for example, organohalosilanes, in a heterogeneous system employing an alkali metal hydride such as sodium hydride, in combination with hydrogen gas under pressure, or sodium hydride and a promoter in the form of a metallic organic compound such as an alkyl-substituted Group III metal, for example, aluminum, boron, and gallium. These methods can be satisfactorily utilized for large scale production, but they are undesirable in many other respects. The employment of in situ sodium hydride by means of hydrogen gas under pressure in combination with metallic sodium requires the use of high pressure equipment which can be expensive as well as hazardous. In addition, in view of their highly basic nature, alkali metal hydrides cannot be employed to reduce a variety of Group IVb halides having organofunctional radicals such as cyanoalkylhalosilanes, due to undesirable side reactions. In addition, the employment of alkali metal hydrides, as reducing agents results in the production of reaction by-products, such as alkali metal halides which cannot be recycled and must be disposed of as they are insoluble in the reaction mixture.

The present invention is based on the discovery that a homogeneous reaction mixture comprising an organostannane of the formula, (2) $$R_dSnH_{4-d}$$

and an effective amount of a Group III metal compound of the formula, (3) $$R'_eQZ_{3-e}$$

can be utilized to reduce halogen atoms of a variety of halogenated materials of certain Group IVb elements, which halogen atoms are attached directly to Group IVb atoms of such halogenated materials of such Group IVb elements selected from silicon and germanium. Included by the halogenated materials of the aforesaid Group IVb elements are halosilanes, halogenated organogermanes, halogenated organosiloxanes, halogenated silhydrocarbon materials, etc., where R is defined above, Z is selected from halogen radicals and hydrogen, R' is an alkyl radical, Q is selected from aluminum and gallium, and $d$ and $e$ are integers equal to from 1 to 3, inclusive.

There is provided by the present invention, the improvement over the prior art method of effecting reduction with an alkali metal hydride in a heterogeneous reaction mixture of halogen atoms attached to atoms of Group IVb elements of halogenated Group IVb elemental material, which improvement comprises (A) effecting reaction in a homogeneous reaction mixture between an organostannane of Formula 2 and said halogenated Group IVb elemental material in the presence of an effective amount of a Group III metal compound of Formulas 3, and 2 recovering from (A) the reaction product of said halogenated Group IVb elemental material.

Radicals included by R of Formula 1 are aryl radicals such as phenyl, tolyl, xylyl, naphthyl, anthracyl, etc.; haloaryl radicals such as chlorophenyl, chloronaphthyl, etc., aralkyl radicals such as phenylethyl, benzyl, etc., aliphatic, haloaliphatic, and cycloaliphatic radicals such as alkenyl and alkyl radicals, for example, methyl, ethyl, propyl, tetrafluorobutyl, pentyl, octyl, etc.; alkenyl radicals such as vinyl, propenyl; cycloalkyl radicals, such as cyclohexyl, cyclohexenyl. Radicals included by R' are all of the aforementioned alkyl radicals included by R. Where R and R' can represent more than one radical in the above formulae, these radicals can be all the same or any two or more of the aforementioned R and R' radicals respectively.

Organostannanes of Formula 2 are, for example, diphenyltindihydride, tributyltinhydride, tri-n-butyltinhydride, triphenyltinhydride, butyltintrihydride, dipropyltindihydride.

Group III metal compounds included by Formula 3 are, for example, triethylaluminum, trimethylgallium, diethylaluminumhydride, methylaluminumdichloride, diethylaluminumbromide, triisobutylgallium, diisobutylaluminumhydride, and methylaluminumsesquichloride.

Included by the halogenated group IVb elemental materials which can be reduced in accordance with the practice of the invention are organohalosilanes of the formula, (4) $$(R'')_aSi(H)_bX_{4-a-b}$$

where R'' is selected from R radicals and monovalent organo-functional radicals such as hydrocarbon, carbalkoxyalkyl radicals, cyanoalkyl radicals, etc.; halogenated organo-siloxanes having halogen radicals attached directly to silicon and consisting essentially of chemically combined units of the formula, $R''SiO_{1.5}$, $(R'')_2SiO$, and $(R'')_3SiO$, such as

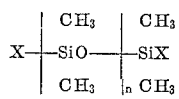

where $n$ is an integer equal to 1 to 500, inclusive. In addition to the reduction of halogen atoms attached to silicon of the aforementioned halosiloxanes, the method of the present invention also provides for the reduction of oxygen radicals attached to silicon. Also included are halogenated silhydrocarbons such as silphenylenes having halogen attached to silicon atoms, for example, p-bis(dimethylchlorosilyl)benzene, etc.; silethylenes having halogen atoms attached to silicon for example, bis(dimethylchlorosilyl)methane, etc. Halogenated materials of germanium such as dimethyldichlorogermane, diphenyldichlorogermane, etc.

Organohalosilanes included by Formula 4 are for example, methyltrichlorosilane, dimethyldichlorosilane, β-cyanoethylmethyldichlorosilane, propyltrichlorosilane, butyltrichlorosilane, amyltrichlorosilane, carbethoxypropylmethyldichlorosilane, amyldichlorosilane, amylchlorosilane, hexyltrichlorosilane, hexyldichlorosilane, hexylchlorosilane, phenyltrichlorosilane, chlorophenyltrichlorosilane, cyanoalkyltrichlorosilane, di-n-propyldichlorosilane, diphenyldichlorosilane, diphenylchlorosilane, n-propyl-n-octyldichlorosilane, tri-n-propylchlorosilane, trifluoropropyltrichlorosilane, allyltrichlorosilane, silicontetrachloride, etc.

In the practice of the invention, reaction is effected between the halogenated Group IVb elemental material, referred to hereinafter as the "Group IVb metal halide," and the organostannane, referred to hereinafter as "tin hydride," in the presence of the Group III metal compound, hereinafter referred to as the "promoter."

Although the order of addition of the various reactants is not critical, it has been found expedient to avoid contact between the Group IVb metal halide and the promoter in the absence of the tin hydride. In order to effectively reduce the Group IVb metal halide, experience has shown that an amount of tin hydride is required to provide for at least a gram equivalent weight of hydrogen attached to tin per gram equivalent weight of halogen attached to Group IVb atoms of the Group IVb metal halide by silicon-halogen linkages. Excess tin hydride, such as an amount sufficient to provide for up to about 4 gram equivalent weights of hydrogen per gram equivalent weight of halogen attached to Group IVb metal atoms also can be employed without adverse results.

Temperatures in the range of between 0° C. to 150° C. can be employed while a preferred range is 25° C. to 100° C. An amount of the promoter which has been found to be effective can be as little as 5 percent by weight of the Group IVb metal halide, while amounts as high as 50 percent or higher will provide for effective results. In order to effect satisfactory heat transfer between the tin hydride and the Group IVb metal halide. a suitable organic solvent which is inert to the reactants during the reduction of the Group IVb metal halide has been found desirable. A suitable organic solvent includes for example, xylene, benzene, tetrahydrofuran, etc.

The termination of the reaction corresponds to the disappearance of chemically combined halogen atoms of the Group IVb metal halide, or disappearance of chemically combined hydrogen atom of tin as determined by the infrared spectrum of the reaction mixture. Recovery of the Group IVb metal hydride can be achieved in accordance with standard methods such as distillation, etc.

In order that those skilled in the art will be better able to practice the invention, the following examples are given by way of illustration, and not by way of limitation. All parts are by weight.

Example 1

There were injected dropwise under a nitrogen atmosphere, 1 part of methylaluminumsesquichloride to a homogeneous mixture of 4.7 parts of dibutylstannane and 6.15 parts of amyltrichlorosilane which was being stirred. The reaction temperature rose immediately from room temperature to 33° C. and the mixture darkened. The mixture was then allowed to remain at ambient temperatures for about 30 minutes after which time it was heated to 50° C. An infrared spectrum of a sample of a mixture showed that the amyltrichlorosilane had been completely reduced to amylsilane as established by the absence of a silicon chloride peak. The presence of the amylsilane was also established by its vapor phase chromatograph. A 70 percent yield of amylsilane was recovered by distilling the mixture and removing an overhead fraction which boiled in the range of between 75° C. to 90° C.

Example 2

There are injected 3 parts of diisobutylaluminum hydride into a homogeneous mixture under a nitrogen atmosphere consisting of 20 parts xylene, 10.8 parts of trimethylchlorosilane and 35 parts of triphenyltinhydride. A gas forms immediately. The resulting gas is collected in a trap cooled to Dry Ice temperature. The reaction mixture is heated to 50° C. to 75° C. to complete the reaction. The condensed gas is identified as trimethylsilane by its infrared spectrum.

Example 3

There were added 5 parts of a 20 percent solution of ethylaluminumsesquichloride in xylene to a homogeneous mixture under a nitrogen atmosphere of 15 parts xylene, 5 parts of diphenyldichlorosilane and 4.7 parts of dibutyltindihydride. The temperature of the mixture rose spontaneously from 25° to 45° C. and it became brown. After maintaining the reaction at 60° C. for 2 hours, an infrared scan of the mixture indicated an absence of tin hydride absorption and the presence of silicon hydride absorption. A vapor phase chromatograph of the mixture showed the presence of diphenylsilane. The reaction mixture was fractionated. There was recovered about an 80 percent yield of diphenylsilane and diphenylchlorosilane.

Example 4

There was injected portionwise 15 parts of a 20 percent solution of ethylaluminumsesquichloride into a homogeneous mixture under a nitrogen atmosphere consisting of 10.8 parts trimethylchlorosilane and 15 parts dibutyltindihydride. A vigorous reaction occurred. There were collected in a Dry Ice-acetone trap, 5.4 parts of a colorless liquid. Its infrared spectrum showed it was trimethylsilane.

Example 5

There was injected 10 parts of a 20 percent solution of ethylaluminumsesquichloride in xylene into a homogeneous mixture under a nitrogen atmosphere of 4.06 parts 1,3-dichlorotetramethyldisiloxane, 10 parts xylene and 9.4 parts dibutyltindihydride. The mixture was heated to 75° C. A gas was recovered in a Dry-Ice acetone trap. There was recovered an 83 percent yield of dimethylsilane. It was identified by its infrared spectrum.

Example 6

There is injected 1 part of trimethylaluminum into a homogeneous mixture of 3.4 parts dimethyldichlorogermane, 4.7 parts dibutyltindihydride and 10 parts xylene. A mildly exothermic reaction occurs. The reaction mixture is brought to reflux at a temperature between 50° C. to 75° C. A colorless liquid is continuously removed. It is identified as dimethylgermane by its infrared spectrum.

While the foregoing examples have been limited to only a few of the very many variables within the scope of the present invention, it should be understood that the process of the present invention is directed to reducing a much broader class of halides of silicon and germanium by employing tin hydride of Formula 2 in the presence of an effective amount of a Group III metal compound of Formula 3 and recovering the reduction product of said halogenated silicon or germanium compound from the resulting reaction mixture.

What I claim as new and desired to secure by Letters Patent of the United States is:

1. A method which comprises (1) effecting reaction in a homogeneous reaction mixture between (A) an organostannane of the formula, $$R_a SnH_{4-a}$$

and (B) a halogenated Group IVb elemental material selected from the class consisting of a halosilane, a halogermane, and a halosiloxane, in the presence of from 5% to 50% by weight based on the weight of (B) of (C) a Group III metal compound of the formula, 

$$R'_eQZ_{3-e}$$

and (2) recovering from the resulting mixture of (1), (D) the corresponding hydride of (B), where (A) is utilized in the mixture of (1) in an amount sufficient to provide for at least one gram equivalent weight of hydrogen attached to tin, per gram equivalent weight of halogen of (B), R is free of aliphatic unsaturation and selected from the class consisting of monovalent hydrocarbon radicals and halogenated monovalent hydrocarbon radicals having from 1 to 8 carbon atoms, R' is an alkyl radical having from 1 to 8 carbon atoms, Q is selected from the class consisting of aluminum and gallium, Z is selected from the class consisting of hydrogen and a halogen radical, and d and e are integers equal to from 1 to 3, inclusive.

2. The method of claim 1, where the organostannane is an alkylstannane.

3. The method of claim 1, where the organostannane is an arylstannane.

4. The method of claim 1, where the Group III metal compound is an alkylaluminum halide.

5. The method of claim 1, where the Group III metal compound is an alkylaluminum.

6. The method of claim 1, where the Group III metal compound is an alkylaluminum hydride.

7. The method of claim 1, where the Group III metal compound is an alkylgallium halide.

References Cited

Henry et al., J. Am. Chem. Soc., 82 (1960), p. 558–561.

Anderson, J. Am. Chem. Soc. 79 (1957), p. 4913–5.

Hurd, Chemistry of the Hydrides, 1952, John Wiley & Sons, Inc., New York, N.Y., p. 97, and 166.

TOBIAS E. LEVOW, *Primary Examiner.*

A. P. DEMERS, *Assistant Examiner.*

U.S. Cl. X.R.

260—448.2